United States Patent [19]
Wilson

[11] Patent Number: 6,118,256
[45] Date of Patent: Sep. 12, 2000

[54] CIRCUIT VOLTAGE REGULATOR MONITOR

[75] Inventor: Glenn E. Wilson, Endicott, N.Y.

[73] Assignee: Emerson Electric Co., St. Louis, Mo.

[21] Appl. No.: 09/365,921

[22] Filed: Aug. 3, 1999

[51] Int. Cl.[7] .................................................. H02J 7/00
[52] U.S. Cl. ........................................ 320/166; 320/167
[58] Field of Search .................................. 320/166, 167; 363/60, 95

[56]  References Cited

U.S. PATENT DOCUMENTS

| | | | |
|---|---|---|---|
| 4,229,688 | 10/1980 | Knox et al. ............................ | 320/134 |
| 5,432,667 | 7/1995 | Rau et al. .............................. | 361/124 |
| 5,488,534 | 1/1996 | Rau et al. .............................. | 361/56 |
| 5,495,384 | 2/1996 | Wallis et al. .......................... | 409/182 |
| 5,534,768 | 7/1996 | Chavannes et al. .................. | 323/267 |
| 5,617,284 | 4/1997 | Paradise ................................ | 361/58 |
| 5,751,530 | 5/1998 | Pelly et al. ............................ | 361/56 |
| 5,777,837 | 7/1998 | Eckel et al. ........................... | 361/160 |
| 5,825,137 | 10/1998 | Titus ...................................... | 315/291 |
| 5,854,730 | 12/1998 | Mitchell et al. ...................... | 361/38 |
| 5,864,454 | 1/1999 | Zaretsky ............................... | 361/127 |
| 5,886,423 | 3/1999 | Gershen et al. ...................... | 307/36 |

*Primary Examiner*—Peter S. Wong
*Assistant Examiner*—Lawrence Luk
*Attorney, Agent, or Firm*—Howrey Simon Arnold & White, LLP

[57] ABSTRACT

A method and apparatus for monitoring the integrity of a voltage regulating device. The voltage regulating device is coupled to a line receiving alternative current power. During normal operation of the voltage regulating device, the method and apparatus includes the use at least one capacitor that is either being charged or discharged on a repetitive basis. The voltage of the capacitor is assessed to determine whether the capacitor is charging or discharging and, thus, whether the voltage regulating device has failed.

27 Claims, 5 Drawing Sheets

CIRCUIT VOLTAGE REGULATOR MONITOR

BACKGROUND OF THE INVENTION

1. Field of the Invention

This invention in general relates to voltage regulators and devices for monitoring the status of voltage regulators and, more particularly, to voltage regulators that are coupled to a line receiving alternating current ("AC") power and devices for monitoring such voltage regulators.

2. Background of the Invention

To protect equipment receiving energy from damage caused by abnormal energy transients appearing on alternating current ("AC") power feed lines, e.g., excess energy caused by a lightening strike, it is common to include in the lines feeding energy to such equipment (or to a distribution facility in a building) one or more transient protection devices. Such devices typically react to abnormal energy transients to protect the equipment by either: (i) creating an open circuit, thus isolating the equipment to be protected; (ii) diverting excess energy to a energy dissipating device; or (iii) clamping the voltage applied to the equipment to an acceptable voltage level, thus controlling the energy applied to the equipment to an acceptable level. Those transient protection devices that clamp the voltage to an acceptable level are commonly known as voltage regulators. In general, a voltage regulator is a two-terminal device that is rendered conductive when the voltage across its terminals exceeds a threshold value and that, when conductive, tends to maintain a voltage across its terminals that is close to the threshold voltage.

Because of the nature of transients, transient protection devices in general and voltage regulators in particular may be required to handle a tremendous amount of energy over a very brief period of time. For example, if the excess energy is generated by a very large energy source (e.g., a large motor in a factory) then the transient protection device, e.g., voltage regulator, must dissipate or otherwise handle the energy remaining after the energy on the protected line is clamped to the threshold level. If the energy supplied to the transient protection device is more than the device can physically dissipate over the allowable time interval, a possibility exists that the transient protection unit might not be able to contain the excess energy, and in such cases, the transient protection device might fail. Such failures may result in the protection device failing "open" wherein the device forms a permanent open circuit or, more likely, the protection device may fail "short" resulting in an a permanent short circuit. For purposes of this disclosure, an open circuit includes both completely open circuits (i.e., essentially infinite resistance between the open parts of the circuit) and circuits wherein the resistance between the open parts of the circuit is so high that no significant current flows between the points. In the same sense, a closed circuit includes circuits wherein the resistance between the points on the circuits is low enough that significant current flows between the points.

Because of the potential importance of transient protection devices to the protection of equipment, it is often important to know whether a particular transient protection device is operable or has failed. In the past, transient protection device monitors have been used for certain classes of transient protection devices, but such monitors are often expensive, require a large number of parts, or require the addition of undesirable elements. For example, past monitors used to determine the operational status of voltage regulators typically included a fuse placed in series with the regulator. The voltage across the fuse would be monitored and this voltage would provide an indication of the current state of the monitored device. Moreover, such fused-based circuits cannot determine the integrity of a voltage regulating device in and of itself because the fused-based systems monitor the only the fuse's integrity and, thus, cannot detect if a voltage regulating device is present or operable. Accordingly, such systems cannot detect voltage regulator failures if the failure is cause by an open voltage regulator.

The above-described, and other limitations, of earlier devices for monitoring the integrity of voltage regulator devices are overcome by the present invention.

SUMMARY OF THE INVENTION

In accordance with one embodiment, the present invention provides an elegant, low-parts count, relatively low cost device and system for monitoring the integrity of a voltage regulating protection device.

In accordance with one embodiment, there is a method for determining whether a voltage regulating protection device that is coupled to a line receiving alternative current power has failed. The method includes providing a switching element and connecting the switching element in parallel with the voltage regulating protection device; providing a capacitor and connecting the capacitor in parallel with the switching element; and providing a voltage source to charge the capacitor. The method also includes, during normal operation of the voltage regulating protection device, discharging the capacitor on a repetitive basis through a variable conductive current path, the variable conductive current path being rendered conductive through the application of sufficient power to the switching element, and the switching element being unable to receive sufficient power when: (i) the voltage regulating protection device is conductive; or (ii) the voltage regulating protection device has failed. The method further includes assessing the voltage of the capacitor to determine whether the capacitor is discharging throughout the current path and, thus, whether the voltage regulating protection device has failed.

In another embodiment, the above method further includes the steps of (i) providing a light emitting device that receives current, and thus emits visible light, when the charge of the capacitor is below a threshold value and the light emitting device does not receive any significant current, and thus does not emit such light, when the capacitor is charged above the threshold value; and (ii) monitoring the light emitting device to determine the operational status of the voltage regulating protection device.

In yet another embodiment, there is a method for determining whether a first or second voltage regulating protection device that is coupled to a line receiving alternative current power has failed. The method comprises of connecting the first voltage regulating protection device in series with the second voltage regulating protection device; providing a first and second switching element and connecting the first and second switching elements in parallel with the first and second voltage regulating protection devices; providing a first and second capacitor and connecting the first and second capacitors in parallel with the first and second switching elements; and providing a voltage source to charge the first and second capacitors. The method also includes, during normal operation of the first and second voltage regulating protection devices, discharging the first and second capacitors on a repetitive basis through a variable conductive current path, the variable conductive current path being rendered conductive through the application of sufficient power to at least one of the first or second switching elements, the at least one of the first or second switching elements being unable to receive the sufficient power when the first or second voltage regulating protection devices has failed. The method further includes assessing the voltage of the first and second capacitors to determine whether the first and second capacitors are discharging throughout the variable conductive current path and, thus, whether the first or second voltage regulating protection devices has failed.

In yet a further embodiment, there is a method for determining whether a voltage regulating protection device that is coupled to a line receiving alternative current power has failed. The method comprises the steps of: providing at least one capacitor; connecting the at least one capacitor in parallel with the voltage regulating protection device; during normal operation of the voltage regulating protection device, charging the at least one capacitor on a repetitive basis; and assessing the voltage of the at least one capacitor to determine whether the at least one capacitor is charging and, thus, whether the voltage regulating protection device has failed. In another embodiment, this method further includes providing a light emitting device that receives current, and thus emits visible light, when the at least one capacitor is charged above a threshold value and does not receive any significant current, and thus does not emit such light, when the at least one capacitor is below the threshold value.

There is still a further embodiment that includes an apparatus for regulating the voltage between two lines receiving power such that the voltage differential between the two lines varies on a repeating basis. The apparatus comprises a first and second voltage regulating device, a capacitor element and a source of energy coupled to the capacitor. The apparatus also includes a means operationally associated with the first and second voltage regulating devices and the capacitor for discharging the capacitor whenever: (i) the first voltage regulating device is rendered conductive and there is no significant current path through the second voltage regulating device; and (ii) the second voltage regulating device is rendered conductive and there is no significant current path through the first voltage regulating device.

In another embodiment, there is an apparatus for monitoring a first and second voltage regulator, the apparatus comprises a first and second capacitor which are coupled in parallel with the first and second voltage regulators. The first and second voltage regulators are electrically connected in series and coupled across an alternating current voltage. The alternating current voltage has a peak voltage and a cycle. The first and second voltage regulators each have conductive threshold voltages less than the peak voltage of the alternating current voltage. There is also a first, second and third current paths. The first current path is capable of conducting current through the first voltage regulator during a first portion of the cycle of the alternating current voltage. The second current path is capable of conducting current through the second voltage regulator during a second portion of the cycle of the alternating current voltage. The third current path being capable of monitoring the state of charge of the first and second capacitors.

In a further embodiment, there is an apparatus for controlling the voltage across two lines that receive alternating current power. The apparatus comprises a first and second voltage regulator, a first current path, a second current path, and a third current path. The first and second voltage regulators are placed in series across the two lines. The first current path is coupled in parallel with the first voltage regulator and includes a first switching element. The second current path is coupled in parallel with the second voltage regulator and includes a second switching element. The third current path includes a first capacitor, a second capacitor, and a light emitting device. The first capacitor is coupled in parallel with the first switching element and the second capacitor is coupled in parallel with the second switching element. The light emitting device may receive current, and thus emits visible light, when the charge of the first and second capacitors are below a threshold value and the light emitting device does not receive any significant current, and thus does not emit such light, when at least one of the first or second capacitors are charged above the threshold value.

In still another embodiment, there is an apparatus for regulating the voltage between two lines receiving power such that the voltage differential between the two lines varies on a repeating basis. The apparatus comprises a first and second voltage regulating device, and a first and second capacitor element. The apparatus also includes, during normal operations, a means for charging the first and second capacitor elements and a means for assessing the voltage across the first and second capacitor elements to determine whether the first and second capacitor elements are charging and thus, whether the first or second voltage regulating devices has failed.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION OF THE INVENTION

Figure 1A:
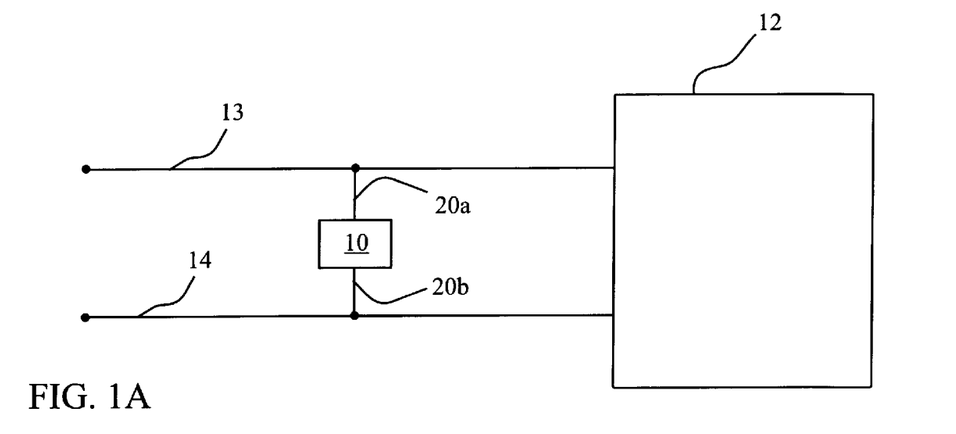
FIGS. 1A–1C illustrate various arrangements in which a voltage regulating protection device 10 in accordance with certain teachings of the present invention may be used.

Turning to the drawings and, in particular to FIG. 1A, an exemplary embodiment of the present invention is shown. Referring to the figure, a piece of equipment 12 to be protected is illustrated as receiving single-phase alternating current power from two power lines 13 and 14. Coupled across the power lines is a voltage regulating protection device 10 that has associated with it a monitoring circuit constructed in accordance with certain teachings of the present invention. In the illustrated example, the voltage regulating protection device normally appears as an open circuit. If, however, the voltage differential across the two inputs to the regulator 10 (i.e., the voltage differential between the two input power lines 13 and 14 in FIG. 1A) exceeds a certain threshold voltage, the regulator will begin to conduct, thus creating a current path between the two power lines 13 and 14, and will tend to clamp the voltage differential between the lines to the threshold voltage level of the regulator. Fuses and other protection devices maybe included in the device 10 without departing from the teachings of the present invention.

Figure 1B:
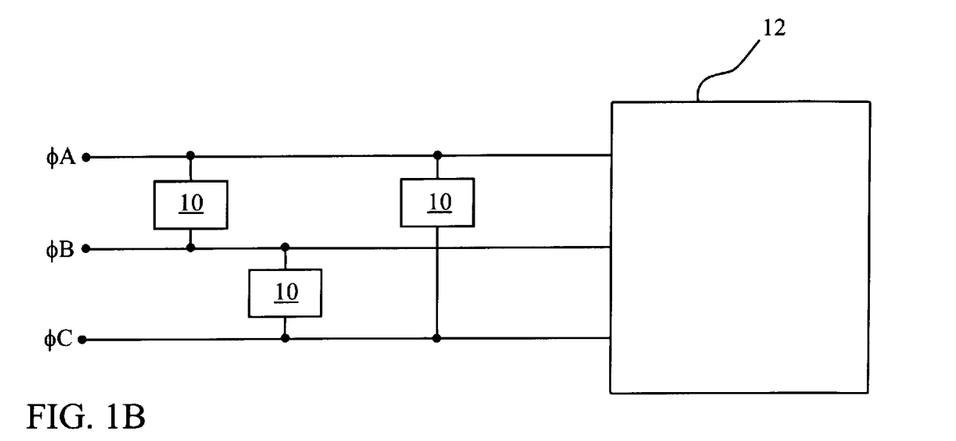
Figure 1C:
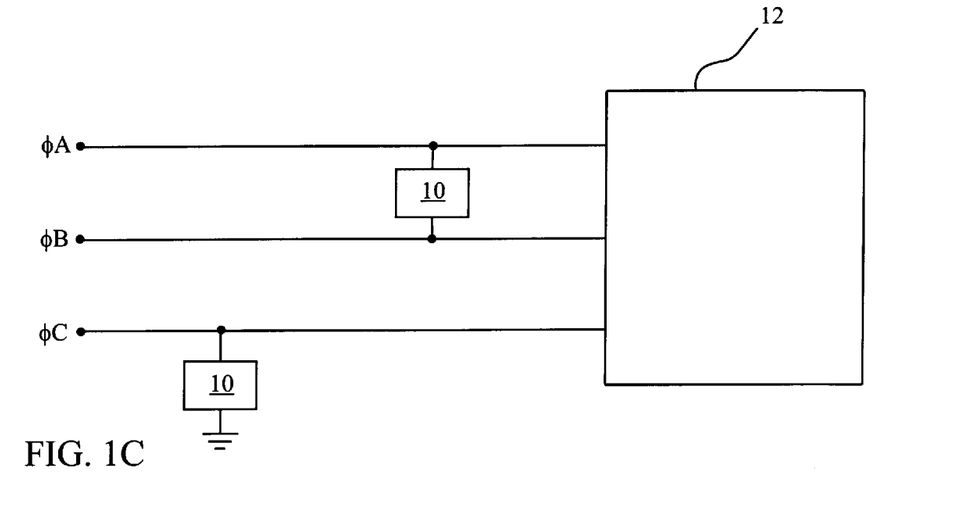

In the examples of FIGS. 1A–1C, the voltage regulator(s) used to construct voltage regulating protection device 10 may take the form of one or more metal oxide varistors (MOVs) although those of ordinary skill in the art having the benefit of this disclosure will understand that an MOV is but one example of an appropriate element for forming a voltage regulator and that other devices could be suitably used in device 10 without departing from the teachings of the present invention.

The equipment 12 in FIG. 1A could be any type of equipment to be protected such as a motor, power drive, electronic system or the like. It could also be a distribution box for a large building. In practice, few large buildings received single-phase AC power as is illustrated in FIG. 1A. Many receive three-phase AC power. FIG. 1B provides an exemplary illustration of the use of the voltage regulating protection devices in accordance with the present invention in a system where three-phase AC power is applied to a piece of equipment 12 which, in the illustrated example, is a power distribution center for a large building.

Referring to FIG. 1B, it may be noted that the voltage regulating protection device 10 is coupled across the input power lines, from line-to-line, in a manner similar to that described above in FIG. 1A. In the illustrated example, a voltage regulating protection device 10 is coupled across and between each of the input power lines. Those of ordinary skill in the art having the benefit of this disclosure will appreciate that fewer voltage regulating protection devices 10 could be used without departing from the teachings of the present invention.

In both FIGS. 1A and 1B, the voltage regulating protection devices 10 were coupled between input power lines in a "line-to-line" manner. In many systems in addition to power lines, neutral lines and/or ground lines or contact points are available and may be used in conjunction with the devices 10 of the present invention. For example, FIG. 1C illustrates the use of a voltage regulating protection device 10 constructed in accordance with certain teachings of the present invention, in a three-phase AC system where the device 10 is coupled between one of the input power lines and ground. Another device 10 is coupled in a line-to-line manner as described above. Those of ordinary skill in the art will understand that the device 10 of the present invention may be used in line-to-line, line-to-neutral, line-to-ground protection networks and networks where combinations of the above (e.g., line-to-line and line-to-ground) are utilized.

Figure 2:
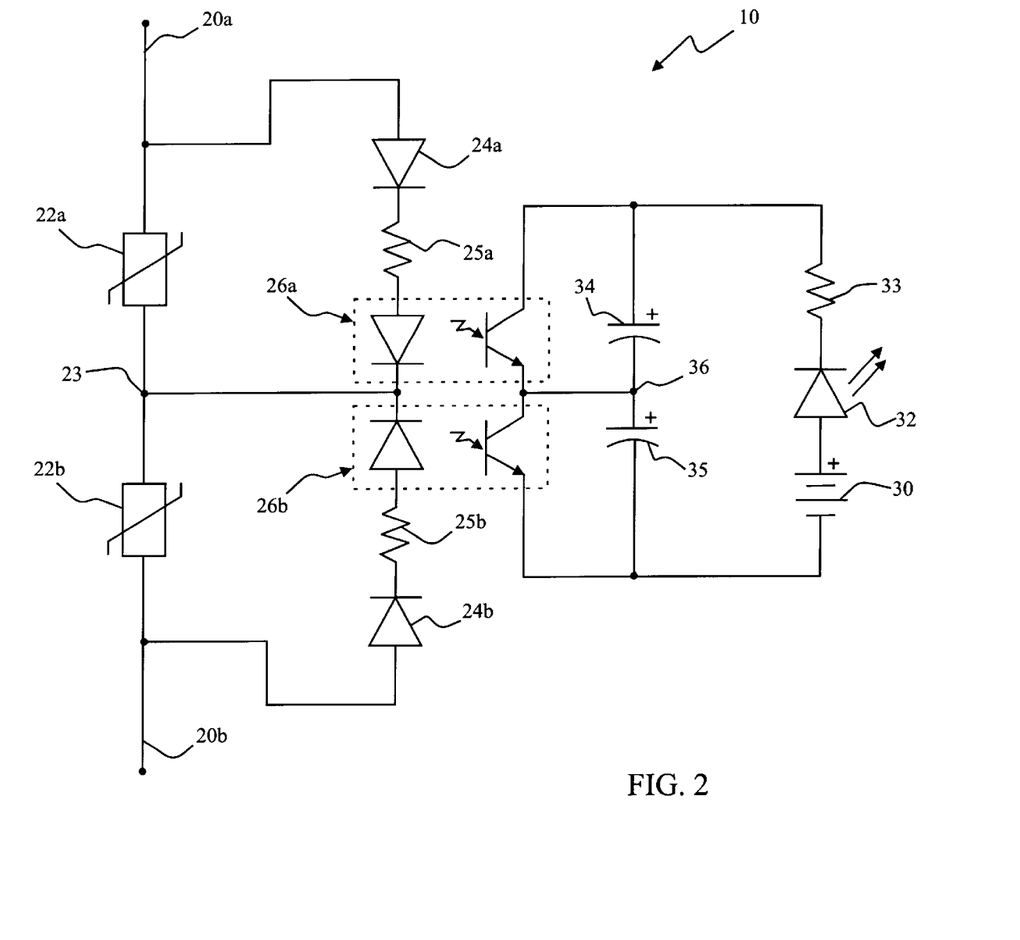
FIG. 2 illustrates one exemplary embodiment of a voltage regulating protection device 10 constructed in accordance with certain teachings of the present invention.

FIG. 2 illustrates one exemplary embodiment of a voltage regulating protection device 10 constructed in accordance with certain teachings of the present invention.

Referring to FIG. 2, the voltage regulating protection device 10 includes two connection terminals 20a and 20b. These connection terminals 20a and 20b are used to couple the voltage regulating protection device 10 across the lines to be protected, as was described above in connection with FIGS. 1A–1C. Thus, for example, terminal 20a may be coupled to one line of a three-phase input power line and terminal 20b to another. Likewise, terminal 20a may be coupled to one line of an input AC power line and terminal 20b to ground. For the sake of simplicity, the discussion of the exemplary embodiment of FIG. 2 will assume that terminal 20a is coupled to one line of an AC power input and terminal 20b is coupled to ground. It should be understood, however, that this arrangement is for exemplary purposes only and that the voltage regulating protection devices of the present invention may be used across any set of AC potentials that are different from each other including line-line and line-neutral lines.

Referring to FIG. 2, two voltage regulators 22a and 22b connected in series and this series connection of voltage regulators is coupled across the terminals 20a and 20b. The voltage regulators 22a and 22b may be any appropriate form of voltage regulators (e.g., MOVs) that generally appear as open circuits but become conductive (or "clamp") when the voltage across the terminals of the device exceed a threshold voltage. The voltage regulators 22a and 22b may be fused or unfused. In the illustrated example, the terminals from the two voltage regulators are coupled together at junction point 23.

In the exemplary circuit of FIG. 2, the threshold voltage at which the voltage regulators 22a and 22b begin to conduct (or clamp) is selected to meet the following two criterion: (i) the threshold voltage for each of the individual voltage regulators 22a and 22b should be less than the peak voltage differential that will appear, during normal operation, across the lines to which terminals 20a and 20b are to be connected; and (ii) the sum of the threshold voltages for voltage regulators 22a and 22b should be greater than the peak voltage differential that will appear, during normal operation, across the lines to which terminals 20a and 20b are to be connected. Thus for example, if it is assumed that single-phase 120V (RMS) AC power is being applied to the power line to which terminal 20a is attached, then the minimum voltage differential that will appear (if 20a is coupled to the power line and 20b is coupled to ground) is approximately 170V, which is the peak voltage value for an 120V (RMS) AC power line when no undesirable transients are on the line. Accordingly, to fulfill criteria (i) above, the threshold voltage for each regulator 22a and 22b must be less than 170 volts and, to fulfill criteria (ii), the sum of the threshold voltages for 22a and 22b must be greater than 170 volts. Thus, using identical threshold voltages, the threshold voltages for each device 22a and 22b could be selected to be 100 volts.

In the example provided above, the threshold voltage for each of the two devices 22a and 22b was set to be equal. Alternate embodiments are envisioned wherein the threshold values of the regulator devices are not equal and vary by significant amounts, as long as the threshold value for each is less than the peak voltage value of the input AC power.

In selecting the threshold values for the regulator devices 22a and 22b, attention should be paid to the equipment that the voltage regulating protection device 10 is intended to protect and the maximum voltage transient for which protection is to be provided. As an example, in the described situation where the threshold for each of the devices is 100 volts, then any voltage transient that causes the voltage differential between the line coupled to terminal 20a and the line coupled to terminal 20b to exceed 200 volts (2×100) will cause the voltage regulators 22a and 22b to establish a conductive path between the terminals 20a and 20b, and, thus, the lines coupled to those terminals. Accordingly, voltage transients that produce voltage differentials less than 200 volts will not render the voltage regulators 22a and 22b conductive and will, thus, pass such transients through to the equipment 12 to which the voltage regulating protection device is coupled. If the equipment was such that the maximum desirable voltage differential that coupled be safely applied was less than 200 volts, then it would be necessary to select different threshold voltage levels for devices 22a and 22b. Those of ordinary skill in the art having the benefit of this disclosure will be able to select the thresholds for devices 22a and 22b in such a manner that they meet the criteria described above and provide adequate protection for the equipment to be used with a voltage regulating protection device 10 constructed according to certain teachings of the present invention.

While FIG. 2 illustrates the use of only two voltage regulating devices in a series, it will be understood that more than two series-connected devices can be included in voltage regulating protection devices 10 without departing from the teachings of the present invention and that fuses and other devices could be also included.

Referring again to the exemplary circuit of FIG. 2, coupled across each of the voltage regulators 22a and 22b is a series connected arrangement comprising a diode, a resistor, and a switching element, which in the exemplary circuit of FIG. 2 is an opto-isolated coupler (or opto-isolator). For example, coupled across voltage regulator 22a is a series connected circuit comprising diode 24a, resistor 25a and opto-isolator 26a arranged such that the anode of diode 24a is electrically coupled to the terminal of regulator 22a that is electrically coupled to terminal 20a, the cathode of diode 24a is coupled to one terminal of resistor 25a, the other terminal of resistor 25a is coupled to one terminal of opto-isolator 26a and the other terminal of opto-isolator 26a is coupled to the junction point 23, where the terminals from regulator 22a and 22b are electrically coupled. The diode 24a and opto-isolator 26a are arranged such that when the diode 24a and any diode in opto-isolator 26a are forward-biased, current may flow through the diode-resistor-diode circuit 24a–25a–26a from the anode of diode 24a, through diode 24a and resistor 25a and then into and through the opto-isolator 26a and to the junction point 23.

In a somewhat similar manner, coupled across voltage regulator 22b is a series connected circuit comprising diode 24b, resistor 25b and an opto-isolator 26b arranged such that the anode of diode 24b is electrically coupled to the terminal of regulator 22b that is electrical coupled to terminal 20b, the cathode of diode 24b is coupled to one terminal of resistor 25b, the other terminal of resistor 25b is coupled to one terminal of opto-isolator 26b and the other terminal of opto-isolator 26b is coupled to the junction point 23. The diode 24b and opto-isolator 26b are arranged such that, when the diode 24b and any diode in opto-isolator 26b are forward-biased, current may flow through the diode-resistor-opto-isolator 24b–25b–26b from the anode of diode 24b, through diode 24b and resistor 25b and then into and through the opto-isolator 26b to the junction point 23.

From the above, it may be noted that when voltage regulators 22a and 22b are in proper operating condition, depending on the value of the input AC waveform: (i) current will flow at varying times, from terminal 20a, through the series connected circuit 24a–25a–26a to junction 23 and through voltage regulator 22b to terminal 20b; (ii) no current will flow at other times; and (iii) current will flow, at varying times, from terminal 20b, through the series connected circuit 24b–25b–26b to junction 23 and through voltage regulator 22a to terminal 20a. This is generally reflected in FIGS. 3A and 3B.

Figure 3A:
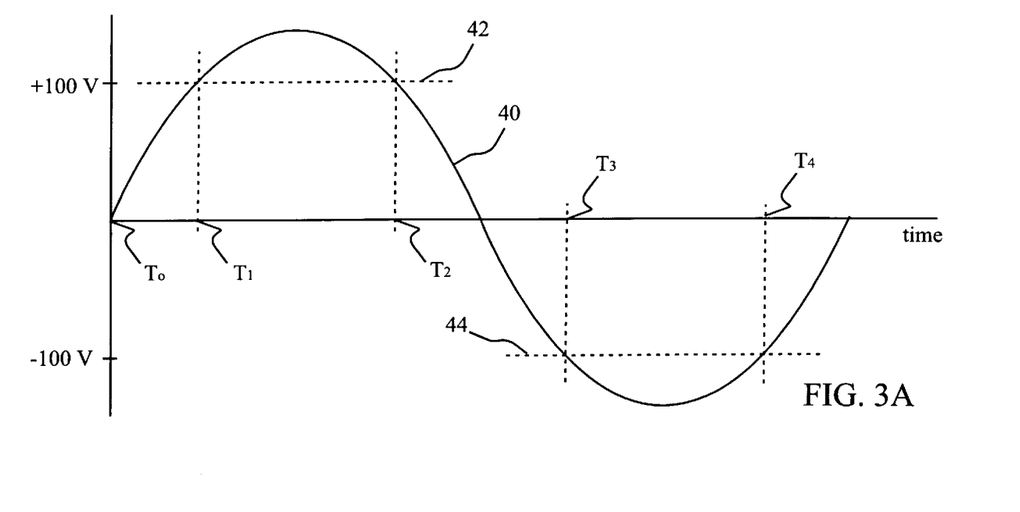
FIGS. 3A and 3B illustrate certain operational characteristics of the device of FIG. 2.
Figure 3B:
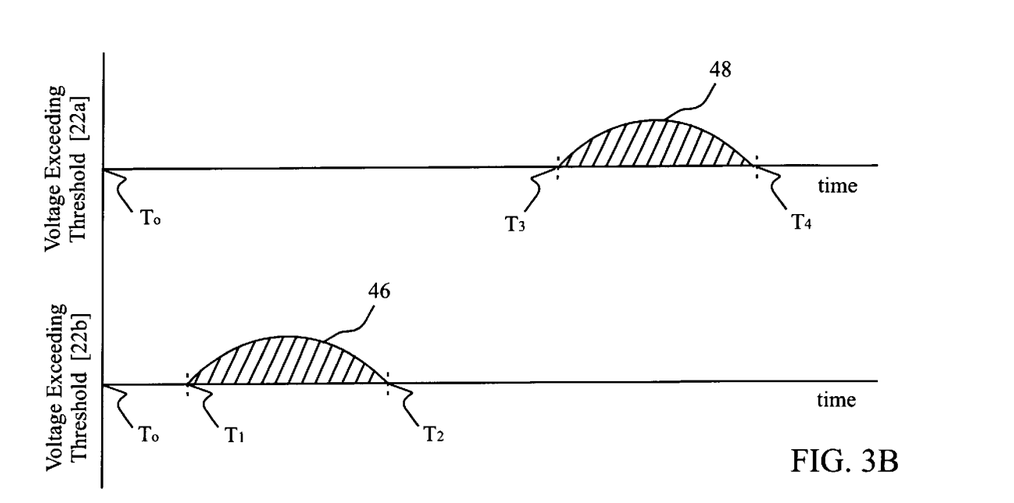

FIGS. 3A and 3B provide rough, exemplary waveforms illustrating the conductive nature of regulators 22a and 22b for the above-described example, e.g., terminal 20a connected to a single phase AC source 120V (RMS); terminal 20b connected to ground; and regulators 22a and 22b having thresholds of 100 volts each. The waveform 40 in FIG. 3A illustrates the value of the AC voltage appearing on terminal 20a and, because terminal 20b is coupled to ground, the differential voltage appearing across terminals 20a and 20b. The dashed lines 42 and 44 above and below the waveform 40 represents the 100 V threshold of regulators 22a and 22b. Note that the threshold voltages of regulators 22a and 22b are preferably lower than the peak voltage of the AC voltage. FIG. 3B provides rough, exemplary waveforms that illustrate, in an idealized manner, the intervals over the cycle of the AC input power over which the regulators 22a and 22b are conductive. The shaded portions of the waveforms 46 and 48 illustrate intervals over which the regulators 22b and 22a are conductive. As may be noted, whenever the absolute magnitude of the input voltage exceeds 100 volts one of the voltage regulators 22a or 22b is conductive.

Referring to FIGS. 2, 3A and 3B, it may be noted that, at time T0 the absolute magnitude of the input AC waveform is zero and neither of the voltage regulators 22a and 22b are conductive. As the value of the input AC voltage increases, a point will be reached (T1) where the magnitude of the AC waveform exceeds the individual threshold voltage of the regulators 22a and 22b. Accordingly, one of the regulators will begin to conduct. In the present example, at time T1, regulator 22b will begin to conduct since the series connection 24a–25a–26a will provide a conductive path from terminal 20a to junction 23 and the differential voltage across voltage regulator 22b will have exceeded its 100 volt threshold. This condition will remain as the input voltage reaches its peak and begins to decline until the voltage falls below the 100 volt threshold of regulator 22b (T2). At this point, regulator 22b will be rendered non-conductive.

It should be noted that, during the interval between T1 and T2 when regulator 22b is conductive, regulator 22a remains in its non-conductive state because the voltage across the regulator will be relatively small (i.e., the voltage drops across diode 24a, 25a and 26a).

As the AC input voltage falls from its value at point T2, to zero and goes negative, both regulators 22a and 22b will be non-conductive and no current will flow through the series of connected circuits 24a–25a–26a or the series of connected circuits 24b–25b–26b. As the input voltage goes negative, however, its voltage level will reach a point at T3 where its absolute value again exceeds 100 volts—the individual threshold value for regulators 22a and 22b. At this point, for reasons as described above, regulator 22a will be rendered conductive and current will flow from terminal 20b, through the series connection of 24b–25b–26b to junction 23 and through the now conductive regulator 22a to terminal 20a.

As the above indicates, during the normal operation of the voltage regulating protection device 10 in FIG. 2, protective devices 22a and 22b will both be rendered conductive—at different periods of time—when the devices 22a and 22b are operating properly. The voltage regulating protection device 10 takes advantage of this characteristic to provide an indication of the operational status of devices 22a and 22b.

Referring to FIG. 2, a voltage source 30 is coupled in series with a light emitting diode ("LED") 32 and a resistor 33. In the exemplary circuit of FIG. 2, the voltage source is a DC source from a battery or a power supply but other suitable power sources may be used. Coupled across the series connection of the voltage source 30 and the LED 32 are two capacitors 34 and 35. Capacitors 34 and 35 are coupled at junction 36.

Coupled across one capacitor 34 are the outputs from the switching device 26a. Coupled across the capacitor 35 are the outputs from the switching device 26b. This configuration of switching devices and capacitors is such that the application of sufficient power to the inputs of the switching devices will cause a closed circuit to be formed between the outputs of the device and result in a short circuit being established across the capacitor coupled to the switching device. Thus, the voltage across capacitors 34 and 35 will be impacted by the presence (or lack of) current flowing through the series connected circuits containing the inputs to switching devices 26a and 26b.

When the protection devices 22a and 22b are operating properly, current will continuously flow through LED 32 and, thus, a light emanating from LED 32 will indicate that both protection devices 22a and 22b are operating properly. This is because when the circuit is first turned on—there will be no voltage across capacitors 34 and 35—and current will flow from voltage source 30, through LED 32, through resistor 33, and begin to charge the series-coupled capacitors 34 and 35. Some time during this charging cycle, when the differential voltage between the AC lines coupled to terminals 20a and 20b exceeds the threshold of voltage regulator 22b, regulator 22b will become conductive. Because during normal operation voltage regulator 22a will be nonconductive at this time, current will begin to flow from the line coupled to terminal 20a, through the series connected path including diode 24a, resistor 25a and switching device 26a, to the line coupled to terminal 20b. The application of current to the inputs of switching device 26a will cause a short circuit of its outputs, and will result in a discharge of the charge built up across capacitor 34.

As the voltage differential between terminals 20a and 20b reaches its peak and begins to decrease, a point can be reached where voltage regulator 22b is no longer conductive and current ceases to flow through switching device 26a. When this occurs, the short across capacitor 34 will be removed and the series connection of capacitors 34 and 35 will begin charging again.

Later in the cycle of the AC power being applied to the lines coupled to terminals 20a and 20b, a point will be reached where the threshold of voltage regulator 22a is reached and regulator 22a will be rendered conductive. When this occurs, a current path will be established from the line coupled to terminal 20b, through the series connected circuit of diode 24b, resistor 25b and switching device 26b, through voltage regulator 22a to the line coupled to terminal 20a. The application of current to switching device 26b will cause a short to appear across capacitor 35, thus discharging the capacitor. Eventually, the voltage differential between terminals 20a and 20b will fall below the threshold of voltage regulator 22b and the cycle described above will repeat, resulting in repetitive partial charging and discharging of capacitors 34 and 35.

As the above indicates, during normal operation of the circuit, one or both of capacitors 34 and/or 35 will always be charging. As such, current will always be flowing from voltage source 30 through LED 32 and the LED 32 will continuously give off visible light, indicating that the protection devices 22a and 22b are operating properly. To ensure this mode of operation, the capacitors 34 and 35 should be sized, when the resistance of resistor 33 and the size of power supply 30 are considered, and the threshold values for regulators 22a and 22b should be selected such that the capacitors 34 and 35 will not charge during normal operation to a level where current flow through LED 32 is reduced below to a level at which no visual light is provided by LED 32. Those of ordinary skill in the art having the benefit of this disclosure will be able to readily select appropriately sized components.

Voltage regulators 22a and/or 22b can either fail open, fail short, or for some reason, an open can occur in the circuit including voltage regulators 22a and 22b. The monitoring portion of the exemplary circuitry of FIG. 2 will detect all such failures.

First, it will be explained how the failure of one of the voltage regulators "short" is detected. It will be assumed for purposes of this discussion that it is regulator 22a that fails "short." When such a failure occurs, the resistance across voltage regulator 22a will be very low and, in any event, much lower that the series connected circuit of diode 24a, resistor 25a, and switching device 26a. As such, during the interval in the AC cycle when voltage regulator 22b is conductive (i.e., the interval over which current would otherwise flow through switching device 26a and thus discharge capacitor 34), current will flow through the shorted voltage regulator 22a and not through the series connection including switching device 26a. As such, no short will be established across the outputs of switching device 26a and capacitor 34 will continue to charge. As capacitor 34 charges, a point will be reached where current ceases to flow through LED 32 and, thus, light from the LED 32 will cease, thus indicating a failure in one of the protection devices. In the same manner, if voltage regulator 22b fails short, capacitor 35 will become fully charged, causing no current to flow through LED 32.

Similarly, an open failure of either of regulators 22a or 22b or the circuiting including such regulators will cause LED 32 to cease to give off light. For example, if regulator 22a fails open, there will be no available path for current to flow from ground through the series connection of diode 24b resistor 25b and switching device 26b to terminal 20a because the open circuit precludes a current path being established through regulator 22a, and diode 24a precludes a path being established through series connected circuit coupled across regulator 22a. Because no current path can be established, switching device 26b will never turn on and capacitor 35 will charge and remain charged, thus precluding sufficient current flow through LED 32. In the same manner, a open-failure of regulator 22b will ensure that no current flows through opto-isolator 26a and that capacitor 34 remains charged to a level to preclude significant current through LED 32.

Figure 4:
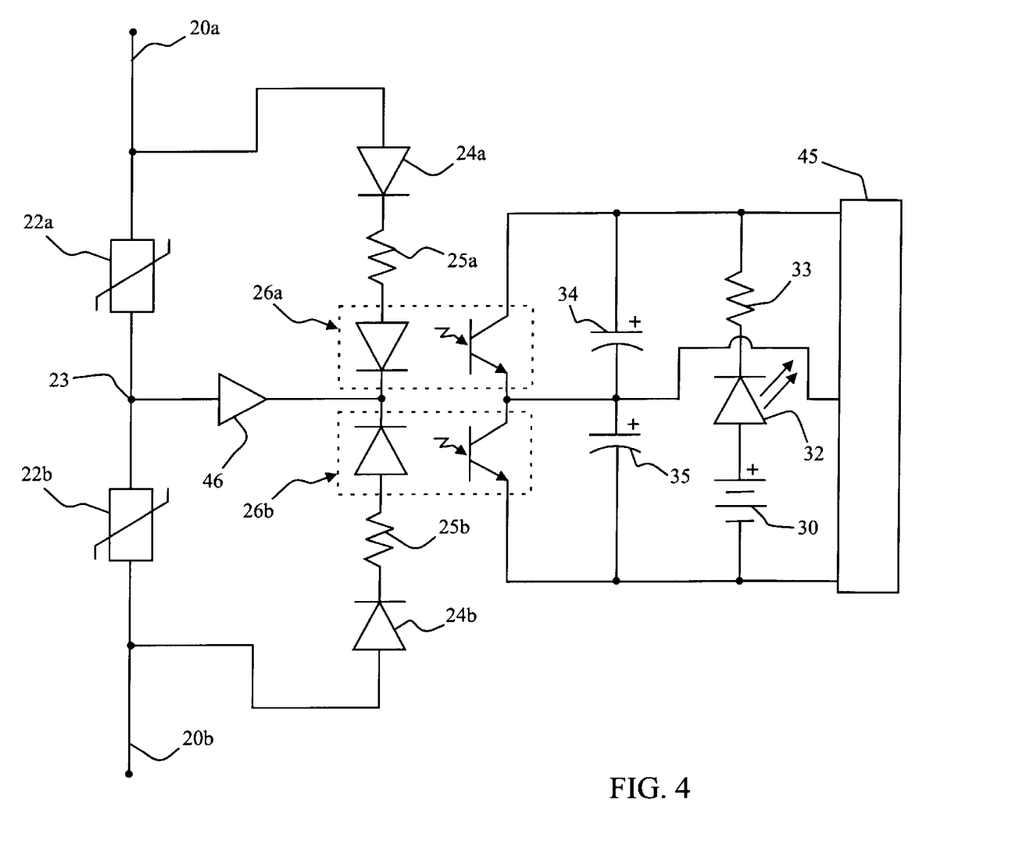
FIG. 4 illustrates an alternate embodiment of the circuitry of FIG. 2, including a voltage monitoring device and a buffer.

In the embodiment of FIG. 2, a LED 32 is utilized to provide a visual indication of the operational status of voltage regulators 22a and 22b. Those of ordinary skill in the art having the benefit of this disclosure will appreciate that other indicator devices may be used. For example, other visual indicators (e.g., an indicator light) may be used. Electrical and electronic devices may also be used to provide automatic monitoring of the circuit. FIG. 4 illustrates one exemplary circuit in which an electrical monitoring device 45 is used to monitor the voltage across the capacitors 34 and 35. Whenever the voltage across one of the capacitors detects the presence of a predetermined voltage threshold for a given period of time indicative of a failure of one of regulator's 22a or 22b, it will signal a failure condition. The construction of an electrical monitoring device will vary depending on the type of monitoring desired, and the construction of such circuits will be within the ability of one of ordinary skill in the art having the benefit of this disclosure.

In some embodiments, it may be desirable to include in the circuit a buffer 46 to reduce the amount of power that is dissipated by the voltage regulators 22a and 22b when the regulators are conductive during normal operation. In the embodiment of FIG. 4, a buffer 46 is illustrated as being coupled between the junction of opto-isolators 26a and 26b and junction 23.

In the embodiment of FIG. 2, two voltage regulators were used to provide voltage protection and two opto-isolators and two capacitors were used together to help detect failure of those regulators. Alternate embodiments are envisioned wherein devices other than opto-isolators are used. One such embodiment is illustrated in FIG. 5.

Figure 5:
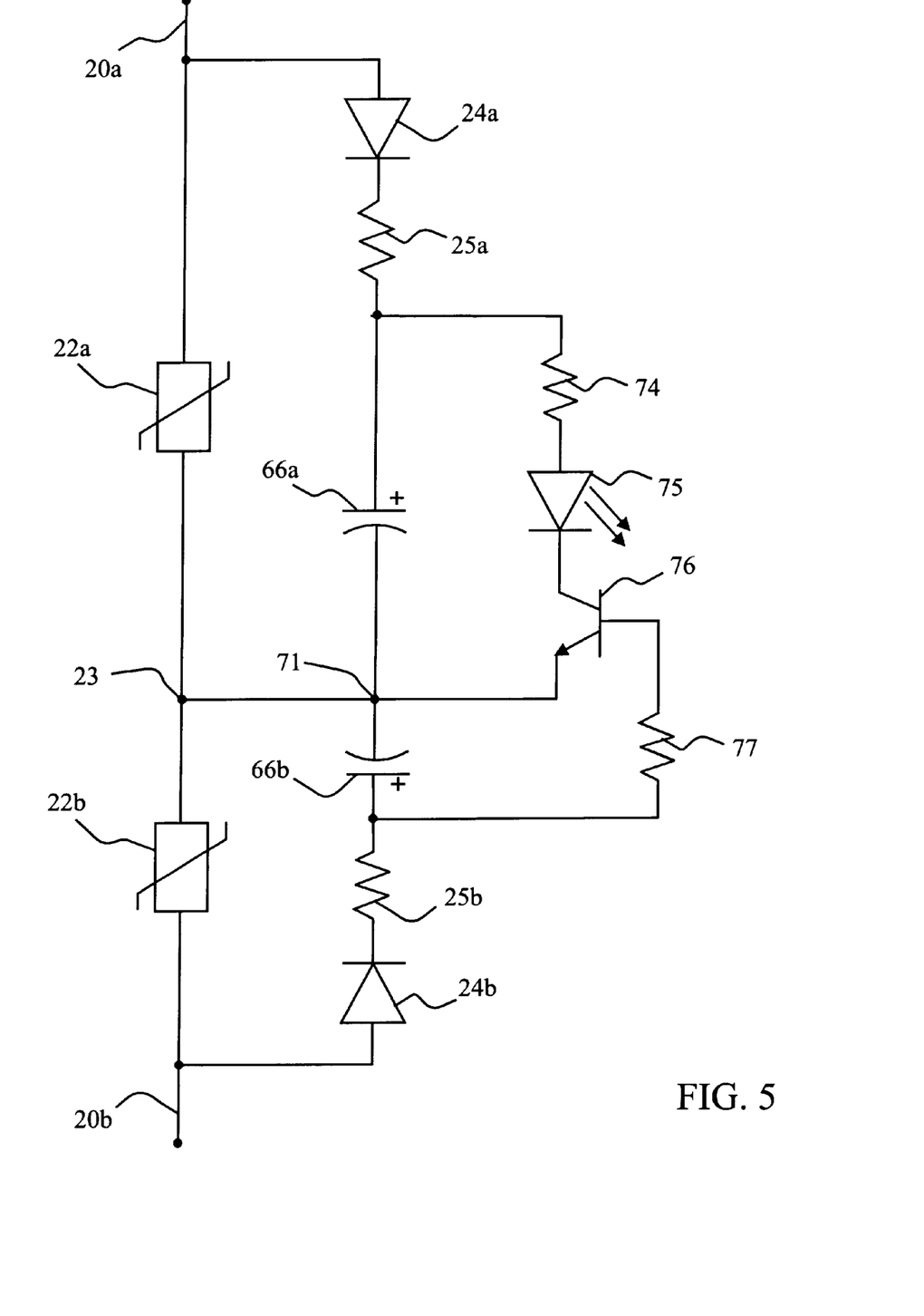
FIG. 5 illustrates an alternate embodiment of a voltage regulating protection device constructed according to certain teachings of the present invention.

Referring to FIG. 5, two voltage regulators 22a and 22b are arranged across terminals 20a and 20b as described above in connection with FIG. 2. Series connected circuits comprising a diode and a resistor are coupled across the regulators in a manner similar to that of FIG. 2 with series connected diode 24a-resistor 25a being coupled across voltage regulator 22a and series-connected diode 24b-resistor 25b being connected across regulator 22b. Additionally, capacitors 66a and 66b are coupled across voltage regulators 22a and 22b, respectively. The capacitors 66a and 66b are coupled at junction 71. Notably, the opto-isolators 26a and 26b found in the circuit of FIG. 2 are not found in the circuit of FIG. 5.

In FIG. 5, there is also a series connected circuit of a resistor, a LED and a switch element, which in the exemplary circuit of FIG. 5 is a transistor. For example, coupled across capacitor 66a is a series connected circuit comprising resistor 74, LED 75 and transistor 76. The anode of the LED 75 is electrically coupled to the resistor 74. The cathode of the LED 75 is electrically coupled to the collector of the transistor 76. The emitter of the transistor 76 is electrically coupled to the junction 71 between capacitors 66a and 66b.

Coupled across the other capacitor 66b is a resistor 77. One terminal of resistor 77 is electrically coupled to the base of the transistor 76. The other terminal of the resister 77 is arranged such it is coupled to the capacitor 66b and one terminal of resistor 25b.

When the protection devices 22a and 22b are operating properly, current will continuously flow through LED 75 and, thus, a light emanating from LED 75. In particular, current flows through LED 75 as a result of the discharging of capacitors 66a and 66b. When capacitor 66b is discharging current, transistor 76 is activated. This causes current to flow through LED 75 from the discharging of current from capacitor 66a.

Capacitors 66a and 66b are recharged through the different cycles of AC power. Some time during the cycle of AC power when the differential voltage between the AC lines coupled to terminals 20a and 20b exceeds the threshold of voltage regulator 22b, regulator 22b will become conductive. Because during normal operation voltage regulator 22a will be non-conductive at this time, current will begin to flow from the line coupled to terminal 20a, through the series connected path including diode 24a, resistor 25a, capacitor 66a, through voltage regulator 22b, and to the line coupled to terminal 20b. Later in the cycle of the AC power being applied to the lines coupled to terminals 20a and 20b, a point will be reached where the threshold of voltage regulator 22a is reached and regulator 22a will be rendered conductive. When this occurs, a current path will be established from the line coupled to terminal 20b, through the series connected circuit of diode 24b, resistor 25b, capacitor 66b, through voltage regulator 22a to the line coupled to terminal 20a. Eventually, the voltage differential between terminals 20a and 20b will fall below the threshold of voltage regulator 22b and the cycle described above will repeat, resulting in repetitive charging of the capacitor 66a. The application of current to the capacitors 66a and 66b will charge the capacitors 66a and 66b.

As the above indicates, during normal operation of the circuit, one or both of capacitors 66a and 66b will be charging or discharging. When discharging, capacitor 66b will activate transistor 76 and current will flow from capacitor 66a through resistor 74, through LED 75 and the LED will continuously give off visible light, indicating that the protection devices 22a and 22b are operating properly. To ensure this mode of operation, the threshold value for voltage regulator 22b and the resistance of resistors 25a and 74 should be selected and sized to control the maximum voltage developed across capacitor 66a. Likewise, the threshold value for voltage regulator 22a and the resistors 25b and 77 should be selected and sized to control the maximum voltage developed across capacitor 66b. Those of ordinary skill in the art having the benefit of this disclosure will be able to readily select appropriately sized components.

As explained earlier, voltage regulators 22a and/or 22b can either fail open, fail short, or for some reason, an open can occur in the circuit including voltage regulators 22a and 22b. The monitoring portion of the exemplary circuitry of FIG. 5 will detect all such failures.

First, it will be explained how the failure of one of the voltage regulators "short" is detected. It will be assumed for purposes of this discussion that it is regulator 22a that falls "short." When such a failure occurs, the resistance across voltage regulator 22a will be very low and, in any event, much lower that the series connected circuit of diode 24a, resistor 25a, and capacitor 66a. As such, during the interval in the AC cycle when voltage regulator 22b is conductive (i.e., the interval over which current would otherwise flow through capacitor 66a and thus charge capacitor 66a), current will flow through the shorted voltage regulator 22a and not through the series connection including capacitor 66a. As such, capacitor 66a will continue to discharge. As capacitor 66a discharges, a point will be reached where current ceases to flow through LED 75 and, thus, light from the LED 75 will cease, thus indicating a failure in one of the protection devices. In the same manner, if voltage regulator 22b fails short, capacitor 66b will become fully discharged, causing the transistor 76 to open and stopping current from flowing through LED 75.

Similarly, an open failure of either of regulators 22a or 22b or the circuiting including such regulators will cause LED 75 to cease to give off light. For example, if regulator 22a fails open, there will be no available path for current to flow from ground through the series connection of diode 24b resistor 25b and capacitor 66b to terminal 20a because the open circuit precludes a current path being established through regulator 22a, and diode 24a precludes a path being established through series connected circuit coupled across regulator 22a. Because no current path can be established, capacitor 66b will not recharge, thus eventually precluding current flow through LED 75 by opening transistor 76. In the same manner, a open-failure of regulator 22b will ensure that no current flows through capacitor 66a and that capacitor 66a will not recharge, precluding significant current through LED 75.

The above description of the present invention is intended to be exemplary only and is not intended to limit the scope of any patent issuing from this application. For example, the present discussion was in the context of circuits utilizing two voltage regulators. The present invention is also applicable to systems using only one regulator or more than two regulators. The present invention is intended to be limited only by the scope and spirit of the following claims.

What is claimed is:

1. A method for determining whether a voltage regulating protection device that is coupled to a line receiving alternate current power has failed, the method comprising the steps of:

a) providing at least one switching element;
   b) connecting the at least one switching element in parallel with the voltage regulating protection device;
   c) providing at least one capacitor;
   d) connecting the at least one capacitor in parallel with the at least one switching element;
   e) providing a voltage source to charge the at least one capacitor;
   f) during normal operation of the voltage regulating protection device, discharging the at least one capacitor on a repetitive basis through a variable conductive current path, the variable conductive current path being rendered conductive through the application of sufficient power to the at least one switching element, the at least one switching element being unable to receive the sufficient power when: (i) the voltage regulating protection device is conductive; or (ii) the voltage regulating protection device has failed; and
   g) assessing the voltage of the at least one capacitor to determine whether the at least one capacitor is discharging throughout the current path and, thus, whether the voltage regulating protection device has failed.

2. The method of claim 1 wherein the step of assessing the voltage of the at least one capacitor includes the steps of:

providing a light emitting device that receives current, and thus emits visible light, when the charge of the at least one capacitor is below a threshold value and that does not receive any significant current, and thus does not emit such light, when the at least one capacitor is charged above the threshold value; and
   monitoring the light emitting device to determine the operational status of the voltage regulating protection device.

3. The method of claim 1 wherein the voltage regulating protection device is a metal oxide varistor.

4. The method of claim 1 wherein the at least one switching element is a opto-isolator.

5. A method for determining whether a first or second voltage regulating protection device that is coupled to a line receiving alternate current power has failed, the method comprising the steps of:

a) connecting the first voltage regulating protection device in series with the second voltage regulating protection device;
   b) providing a first and second switching element;
   c) connecting the first switching element in parallel with the first voltage regulating protection device;
   d) connecting the second switching element in parallel with the second voltage regulating protection device;
   e) providing a first and second capacitor;
   f) connecting the first capacitor in parallel with the first switching element;
   g) connecting the second capacitor in parallel with the second switching element;
   h) providing a voltage source to charge the first and second capacitors;
   i) during normal operation of the first and second voltage regulating protection devices, discharging the first and second capacitors on a repetitive basis through at least one variable conductive current path, the at least one variable conductive current path being rendered conductive through the application of sufficient power to at least one of the first or second switching elements, the at least one of the first or second switching elements being unable to receive the sufficient power when the first or second voltage regulating protection device has failed; and
   j) assessing the voltage of the first and second capacitors to determine whether the first and second capacitors are discharging throughout the at least one variable conductive current path and, thus, whether the first or second voltage regulating protection device has failed.

6. The method of claim 5 wherein the step of assessing the voltage of the first and second capacitors includes the steps of:

providing a light emitting device that receives current, and thus emits visible light, when the charge of the first and second capacitors are below a threshold value and that does not receive any significant current, and thus does not emit such light, when the first and second capacitors are charged above the threshold value; and
   monitoring the light emitting device to determine the operational status of the voltage regulating protection device.

7. The method of claim 5 wherein the first and second voltage regulating protection devices are metal oxide varistors.

8. The method of claim 5 wherein the first and second switching elements are opto-isolators.

9. A method for determining whether a voltage regulating protection device that is coupled to a line receiving alternate current power has failed, the method comprising the steps of:

a) providing at least one capacitor;
   b) connecting the at least one capacitor in parallel with the voltage regulating protection device;
   c) during normal operation of the voltage regulating protection device, charging the at least one capacitor on a repetitive basis; and
   d) assessing the voltage of the at least one capacitor to determine whether the at least one capacitor is charging and, thus, whether the voltage regulating protection device has failed.

10. The method of claim 9 wherein the step of assessing the voltage of the at least one capacitor includes the steps of:

providing a light emitting device that receives current, and thus emits visible light, when the at least one capacitor is charged above a threshold value and that does not receive any significant current, and thus does not emit such light, when the at least one capacitor is below the threshold value; and
    monitoring the light emitting device to determine the operational status of the voltage regulating protection device.

11. The method of claim 9 wherein the voltage regulating protection device is a metal oxide varistor.

12. Apparatus for regulating the voltage between two lines receiving power such that the voltage differential between the two lines varies on a repeating basis, the apparatus comprising:

a) a first voltage regulating device having a first contact electrically coupled to one of the two lines;

b) a second voltage regulating device having a first contact coupled to the other of the two lines and a second contact coupled to a second contact of the first voltage regulating device;

c) the first and second voltage regulating devices being such that they are each rendered conductive whenever the voltage differential between their respective first and second contacts exceeds a threshold value;

d) a capacitor element;

e) a source of energy coupled to the capacitor; and f) means operationally associated with the first and second voltage regulating devices and the capacitor for discharging the capacitor whenever: (i) the first voltage regulating device is rendered conductive and there is no significant current path between the first and second contacts of the second voltage regulating device; or (ii) the second voltage regulating device is rendered conductive and there is no significant current path between the first and second contacts of the first voltage regulating device.

13. The apparatus of claim 12 wherein the first and second voltage regulating devices are metal oxide varistors.

14. The apparatus of claim 12 wherein the means for discharging the capacitor includes at least one second switching element.

15. The apparatus of claim 14 wherein the at least one second switching element is an opto-isolator.

16. Apparatus for monitoring a first and second voltage regulator, the apparatus comprising:

a) a first capacitor coupled in parallel with the first voltage regulator;

b) a second capacitor coupled in parallel with the second voltage regulator, the first and second capacitors each having a state of charge;

c) the first voltage regulator electrically connected in series to the second voltage regulator;

d) the first and second voltage regulators coupled across an alternating current voltage having a peak voltage and a cycle;

e) the first voltage regulator having a first conductive threshold voltage less than the peak voltage of the alternating current voltage;

f) the second voltage regulator having a second conductive threshold voltage less than the peak voltage of the alternating current voltage;

g) a first current path being capable of conducting current through the first voltage regulator during a first portion of the cycle of the alternating current voltage;

h) a second current path being capable of conducting current through the second voltage regulator during a second portion of the cycle of the alternating current voltage; and i) a third current path being capable of monitoring the state of charge of the first and second capacitors.

17. The apparatus of claim 16 wherein the first and second voltage regulators are metal oxide varistors.

18. The apparatus of claim 16 wherein the first and second conductive threshold voltages are each about 100 volts.

19. The apparatus of claim 16 wherein the third current path includes a light emitting device that receives current, and thus emits visible light, when the charge the first and second capacitors are below a threshold value and that does not receive any significant current, and thus does not emit such light, when at least one of the first or second capacitors are charged above the threshold value.

20. Apparatus for controlling the voltage across two lines that receive alternating current power, the apparatus comprising:

a) a first voltage regulator having a first input coupled to one of the two lines and a second input;

b) a second voltage regulator having a first input coupled to the other of the two lines and a second input coupled to the second input of the first voltage regulator;

c) a first current path coupled in parallel with the first voltage regulator, the first current path including a first switching element;

d) a second current path coupled in parallel with the second voltage regulator, the second current path including a second switching element; and e) a third current path including a first capacitor, a second capacitor, and a light emitting device, the first capacitor coupled in parallel with the first switching element, the second capacitor coupled in parallel with the second switching element.

21. The apparatus of claim 20 wherein the first and second voltage regulators are metal oxide varistors.

22. The apparatus of claim 20 wherein the first and second switching elements are an opto-isolator.

23. The apparatus of claim 20 wherein the light emitting device receives current, and thus emits visible light, when the charge the first and second capacitors are below a threshold value and that does not receive any significant current, and thus does not emit such light, when at least one of the first or second capacitors are charged above the threshold value.

24. The apparatus of claim 20 wherein the first and second current paths include at least one buffer element.

25. Apparatus for regulating the voltage between two lines receiving power such that the voltage differential between the two lines varies on a repeating basis, the apparatus comprising:

a) a first voltage regulating device having a first contact electrically coupled to one of the two lines;

b) a second voltage regulating device having a first contact coupled to the other of the two lines and a second contact coupled to a second contact of the first voltage regulating device;

c) the first and second voltage regulating devices being such that they are each rendered conductive whenever the voltage differential between their respective first and second contacts exceeds a threshold value;

d) at first capacitor element electrically connected in parallel to the first voltage regulating device;

e) a second capacitor element electrically connected in parallel to the second voltage regulating device;

f) during normal operations, means for charging the first capacitor element whenever the second voltage regulating device is rendered conductive and there is no significant current path between the first and second contacts of the first voltage regulating device;

g) during normal operations, means for charging the second capacitor element whenever the first voltage regulating device is rendered conductive and there is no significant current path between the first and second contacts of the second voltage regulating device;

h) means for assessing voltage across the first and second capacitor elements to determine whether the first and second capacitor elements are charging and, thus, whether the first or second voltage regulating device has failed.

26. The apparatus of claim 25 wherein the first and second voltage regulating devices are metal oxide varistors.

27. The apparatus of claim 25 wherein the means for assessing voltage across the first and second capacitor elements includes a light emitting device that receives current, and thus emits visible light, when the charge of the first and second capacitor elements are charged above a threshold value and that does not receive any significant current, and thus does not emit such light, when at least one of the first or second capacitor elements are below a threshold value.

* * * * *